(12) United States Patent
Sanchelli

(10) Patent No.: US 7,549,451 B2
(45) Date of Patent: Jun. 23, 2009

(54) DOUBLE-FOLD SNOW MITT/SNOW GLOVE FOR SNOW SHOVEL

(76) Inventor: Barbara Ann Sanchelli, 10C Utah Dr., Matawan, NJ (US) 07747

(*) Notice: Subject to any disclaimer, the term of this patent is extended or adjusted under 35 U.S.C. 154(b) by 68 days.

(21) Appl. No.: 11/699,723

(22) Filed: Jan. 31, 2007

(65) Prior Publication Data
US 2008/0178498 A1 Jul. 31, 2008

(51) Int. Cl.
*B65D 85/00* (2006.01)
*E01H 5/02* (2006.01)
*E02F 3/00* (2006.01)

(52) U.S. Cl. .................... 150/161; 37/285; 37/466; 37/903

(58) Field of Classification Search .............. 150/161, 150/154; 383/109, 114; 37/285, 466, 903
See application file for complete search history.

(56) References Cited

U.S. PATENT DOCUMENTS 3,734,394 A * 5/1973 Dooley .................. 383/109
4,667,716 A * 5/1987 Solheim et al. ............ 150/160

* cited by examiner

*Primary Examiner*—Tri M Mai
(74) *Attorney, Agent, or Firm*—Charles I. Brodsky

(57) ABSTRACT

A double-folded envelope of felt (or other fabric resistant to snow adhesion) into which a snow shovel may be inserted, folded over to enclose the shovel and temporarily closed in place by snaps or Velcro—doubled over where the shovel blade would rest so as to afford optimal protection against marring the finish of a car or sport utility vehicle when the shovel handle is grasped to push or scrape snow from off the vehicle's surfaces.

17 Claims, 1 Drawing Sheet

DOUBLE-FOLD SNOW MITT/SNOW GLOVE FOR SNOW SHOVEL

CROSS-REFERENCE TO RELATED APPLICATIONS

NONE

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

1. Field of the Invention

This invention relates to the clearing of snow from automobiles and sport utility vehicles, in general, and to a modification of the snow mitt/snow glove of my U.S. Pat. No. 7,063,114, in particular.

2. Description of the Related Art

The snow mitt/snow glove of my patent utilized an envelope of fabric exhibiting a resistance to retaining snow on its surface into which a snow shovel was inserted. In a preferred embodiment of the invention, the sides of the envelope were sewn, and the envelope temporarily closed about the shovel by snaps or a Velcro-type hook and loop adhesive. The fabric was reenforced by a rubberized strip in the area where the blade of the shovel rested to afford protection against scratching the automotive vehicle's surface. The invention allowed a "push-type" shoveling motion to clear snow that had accumulated on the vehicle during a storm. In the preferred embodiment, an envelope of felt was utilized, into which an eighteen to twenty-two inch size snow shovel was inserted. In this manner, protection was had against marring the finish of the vehicle pushing snow from its various surfaces.

SUMMARY OF THE INVENTION

The present invention serves to create a more durable snow remover—and one affording increased protection against marring of the vehicle's surfaces. This is accomplished by modifying the reenforcement of the fabric at the area where the blade of the shovel rested. When employing the rubberized reenforcement strip, the possibility of an increased wearing out of the fabric could result—with a consequent scratching of the vehicle's surface. This was so when having to scrape off snow which had turned to ice in the colder locations of measurably higher humidity content. As will become clear from the description that follows, an increased durability and increased protection against scratching results from replacing the rubberized strip with a doubling-over of the fabric instead.

BRIEF DESCRIPTION OF THE DRAWINGS

These and other features of the present invention will be more clearly understood from a consideration of the following description taken in connection with the accompanying drawings in which.

DETAILED DESCRIPTION OF THE INVENTION

Figure 1:
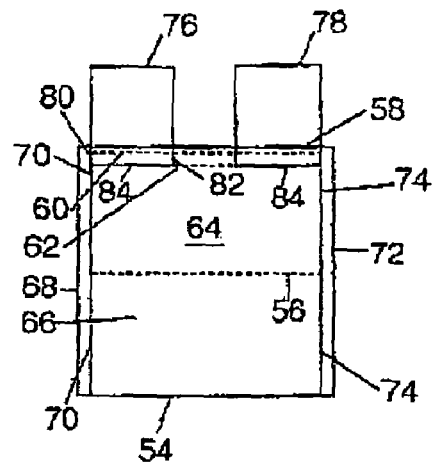
FIG. 1 shows an unassembled double-fold snow mitt/snow glove constructed in accordance with the invention.

In FIGS. 1-4, an envelope for receiving a snow shovel 10 having a blade 12 of given length 14 and height 16, and a handle 18 of given thickness 20, begins with a fabric which resists adhesion to snow. This is to protect the finish of the automobile or sport utility vehicle as the shovel which is to be placed within an envelope of the fabric is pushed forwardly. A fabric which accomplishes this is preferably a felt material. The felt material is cut slightly wider than the shovel blade—for example, 24 inches for a 22 inch blade. A length of 54 inches for this width is preferable, in accordance with the following description of the invention.

The fabric is laid on a flat surface in the manufacture of the envelope, and upwardly folded half-way along its length. The resulting bottom edge 54 is then folded upwardly about a fold line 56 towards the top edge 58, but to a point short of it, where the bottom edge 54 falls between ½ inch and 1 inch below the top edge 58. The top edge 58 is then folded over the bottom edge 54, along the line 60 in FIG. 1. The two edges 54 and 58 are then sewn together at 62, with the top edge 58 overlying the bottom edge 54.

As shown in FIG. 1, the "inside surface" of the envelope being formed is shown at 64 as the upwardly folded-over bottom-half portion of the fabric, while the "outside surface" of the envelope is shown at 66, the top-half portion of the fabric underneath. The left hand edge 68 of the "outside surface" is folded over the left hand edge 70 of the "inside surface", and the two edges are sewn together. In similar manner, the right hand edge 72 of the "outside surface" is folded over the right hand edge 74 of the "inside surface", and the two edges are also sewn together. A pair of straps 76, 78 are sewn to the fabric along the folded-over top edge 58 and to the "inside surface" of the envelope, at 80, 82 and 84. The straps 76, 78 are of a length to extend upwardly beyond the sewn line 62—3 inches, for example, for an overall strap length of 5 inches. The width of the strap may, for such dimensioning, be of the order of 3 inches—with the two straps being spaced 13½ inches apart.

Figure 2:
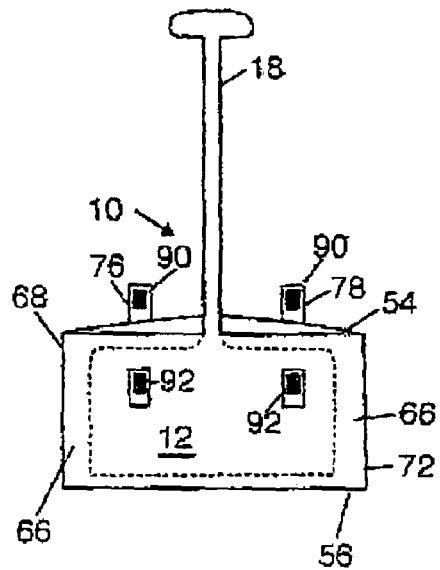
FIGS. 2 and 3 are views showing a manner of fitting a snow shovel within the double-fold snow mitt/snow glove of the invention.
Figure 3:
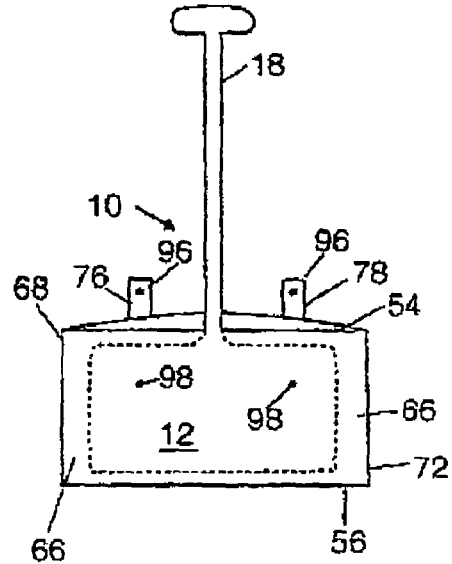
Figure 4:
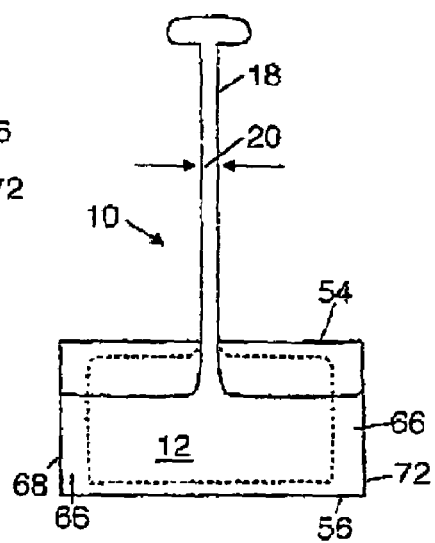
FIG. 4 is a view of the double-fold snow mitt/snow glove and inserted snow shovel as they may be used or stored away.

As shown in FIG. 2, a hook component 90 of a Velcro hook-and-loop adhesive is sewn adjacent the top edge of each of the straps 76, 78. A loop component 92 of the hook-and-loop adhesive is sewn on the "outside surface" of the envelope, approximately ½ inch from the bottom edge 54.

In the preferred construction of the invention shown in FIG. 2, the hook component 90 joins with the loop component 92 for each of the straps 76, 78. A closing of the snow mitt/snow glove envelope about the shovel would then take the general form shown in FIG. 4. Obviously, the hook and loop adhesive strap securements could be reversed, in which case the appearance of the snow mitt/snow glove shovel combination would take the form of the opposite of FIG. 4. In such instance, the straps would extend from the "outside surface" to the "inside surface" rather than in the inside/outside arrangement of FIG. 4. In another construction of the invention, the openable strap closures could take the form of any type of strap arrangement—such as with snaps 96, 98 for joining the closures, as in FIG. 3.

The end result will be recognized to be a replacement of the rubberized strip of my U.S. Pat. No. 7,063,114 by a doubling-over of the fabric material employed. The added thickness of the envelope provides both the reinforcement for the shovel blade without reducing its ability to clear the snow accumulations from the vehicle's surfaces. At the same time, the resilience and smoothness are retained to continue the protection for the finish when scraping the snow away.

While there have been described what are considered to be preferred embodiments of the present invention, it will be readily appreciated by those skilled in the art that modifications can be made without departing from the scope of the teachings herein. For at least such reason, therefore, resort-should be had to the claims appended hereto for a true understanding of the invention.

I claim:

1. The combination comprising:
   an envelope of a composition characterized by a resistance to snow adhesion, and a snow shovel having a handle of given thickness and a blade of given length and height inserted within said envelope to scrape snow and ice from an automotive vehicle;
   said envelope providing a first layer overlying a second layer, with each layer defined by top, bottom and opposing side edges;
   first means for joining the top edge of one of said first and second layers with the top edge of said other of said first and second layers;
   second means for joining individual ones of said opposing side edges of one of said first and second layers with corresponding opposing side edges of said other of said first and second layers;
   first and second openable closures extending from one of said first and second layers over the top edges thereof;
   third means on one of said first and second layers for removably securing with said first and second openable closures in closing said layers as a mitt or glove; and
   with said first and second layers being folded over substantially half-way between their said top and bottom edges;
   with said snow shovel being inserted between said top, bottom and opposing side edges of each of said first and second layers;
   with said first and second openable closures of said envelope being spaced apart a distance at least as great as said snow shovel handle thickness;
   with said envelope being composed of a double-folded fabric formed by folding the fabric about a first fold line upwardly halfway along its length towards its top edge, by folding the fabric upwardly once more along its length about a second fold line to a point where the first fold line falls short of the top edge of said one of said first and second layers and by folding the top edge of said one layer downwardly about a third fold line over said first fold line; and
   with said double-sided fabric providing enhanced protection against the snow shovel scratching the automotive vehicle when scraping snow and ice from its surface.

2. The combination of claim 1 wherein said top and bottom edges of each of said first and second layers are spaced apart a distance at least as great as said snow shovel blade height.

3. The combination of claim 1 wherein said opposing side edges of each of said first and second layers are spaced apart a distance at least as great as said snow shovel blade length.

4. The combination of claim 1 wherein said top and bottom edges of each of said first and second layers are spaced apart a distance at least as great as said snow shovel blade height, and wherein said opposing side edges of each of said first and second layers are spaced apart a distance at least as great as said snow shovel blade length.

5. The combination of claim 1 wherein said first and second openable closures comprise a pair of straps and wherein said third means comprise a pair of snaps to respectively secure with said straps.

6. The combination of claim 1 wherein said first and second openable closures comprise a pair of flaps and wherein said third means removably secures with said flaps in closing said layers as said mitt or glove.

7. The combination of claim 6 wherein said third means includes one of a hook and loop of a pair of hook-and-loop adhesives to couple with the other of said hook and loop of said pair of adhesives on individual undersides of each of said over-extending first and second flaps.

8. The combination of claim 6 wherein each of said flaps comprise a strip of one of the hook and loop portions of a pair of hook-and-loop-adhesives to couple with said third means comprising the other of said hook and loop portions of said hook-and-loop-adhesives.

9. The combination of claim 1 wherein said first and second layers are each of a length of substantially twenty-seven inches and a width of substantially twenty-four inches.

10. The combination of claim 9 wherein said openable closures are spaced apart a distance of substantially thirteen and a half inches.

11. The combination of claim 9 wherein said openable closures are each of a length of substantially five inches.

12. The combination of claim 9 wherein said openable closures are each of a width of substantially three inches.

13. The combination of claim 1 wherein said first and second layers are fabricated of felt.

14. The combination of claim 1 wherein said first means and second means for joining said top edges and for joining said side edges comprising sewing.

15. The combination of claim 1 wherein said first and second openable closures comprise a pair of flaps extending from an inside surface of said first layer adjacent the top edge thereof and wherein said third means extends from an outer surface of said second layer adjacent said substantially half-way foldover to removably secure with said flaps enclosing said first and second layers as said mitt or glove.

16. The combination of claim 15 wherein said third means includes one of a hook and loop of a pair of hook-and-loop adhesives to couple with the other of said hook and loop of said pair of adhesives on individual undersides of each of said over-extending first and second flaps.

17. The combination of claim 15 wherein each of said flaps comprise a strip of one of the hook and loop portions of a pair of hook-and-loop-adhesives to couple with said third means comprising the other of said hook and loop portions of said hook-and-loop-adhesives.

* * * * *